United States Patent
Kobayashi

(10) Patent No.: US 6,659,220 B2
(45) Date of Patent: Dec. 9, 2003

(54) FRONT GRILL STRUCTURE

(75) Inventor: Kazuhiko Kobayashi, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 44 days.

(21) Appl. No.: 10/042,214

(22) Filed: Jan. 11, 2002

(65) Prior Publication Data

US 2002/0096378 A1 Jul. 25, 2002

(30) Foreign Application Priority Data

Jan. 22, 2001 (JP) ........................................ 2001-013419

(51) Int. Cl.⁷ ................................................. B60K 11/04
(52) U.S. Cl. ........................ 180/686; 180/68.1; 293/155
(58) Field of Search ............................... 180/68.1, 68.2, 180/68.3, 68.4, 68.5, 68.6, 69.2, 69.22, 69.24, 69.25; 293/121, 136, 155, 102, 120, 115; 296/194, 192, 197, 203, 203.02

(56) References Cited

U.S. PATENT DOCUMENTS

| | | | | |
|---|---|---|---|---|
| 1,816,372 A | * | 7/1931 | Herz .......................... | 180/68.6 |
| 4,334,588 A | * | 6/1982 | Tezuka et al. ............. | 180/68.6 |
| 4,424,996 A | * | 1/1984 | Yoshiyuki .................. | 293/117 |
| 4,566,407 A | * | 1/1986 | Peter ......................... | 180/68.4 |
| 4,597,603 A | * | 7/1986 | Trabert ...................... | 296/194 |
| 4,753,468 A | * | 6/1988 | Szymczak et al. .......... | 293/132 |
| 5,066,057 A | * | 11/1991 | Furuta et al. ............... | 293/121 |
| 5,123,695 A | * | 6/1992 | Kanemitsu et al. ......... | 296/194 |
| 5,403,048 A | * | 4/1995 | Ekladyous et al. ......... | 293/155 |
| 5,409,288 A | * | 4/1995 | Masuda ...................... | 296/194 |
| 5,478,127 A | * | 12/1995 | Chase ......................... | 293/115 |
| 5,490,574 A | * | 2/1996 | Ishiizumi et al. .......... | 180/68.1 |
| 5,573,299 A | * | 11/1996 | Masuda ...................... | 180/68.4 |
| 5,887,672 A | * | 3/1999 | Kimura ...................... | 180/68.1 |
| 5,941,329 A | * | 8/1999 | Ichioka et al. ............. | 180/68.6 |
| 6,186,583 B1 | * | 2/2001 | Martin .................. | 296/203.02 |
| 6,412,581 B2 | * | 7/2002 | Enomoto et al. .......... | 180/68.4 |

FOREIGN PATENT DOCUMENTS

JP             59-53150        4/1984

* cited by examiner

*Primary Examiner*—Brian L. Johnson
*Assistant Examiner*—Hau Phan
(74) *Attorney, Agent, or Firm*—Nath & Associates PLLC; Marvin C. Berkowitz

(57) ABSTRACT

A front grill structure includes a cover interposed between a front grill and a front bumper opening, which is formed in the upper portion of a front bumper to introduce engine cooling air, so as to cover the upper surface of the front bumper. A front bumper opening end and a bumper reinforcing flange are not visible through the front bumper opening because they are covered with the cover, and thereby the external appearance of the front grill structure can be improved. Further, since the bumper reinforcing flange is covered with the cover, it can be formed at any arbitrary height, and thereby the rigidity of the front bumper can be improved.

3 Claims, 6 Drawing Sheets

FRONT GRILL STRUCTURE

BACKGROUND OF THE INVENTION

1. Field of the Invention

The present invention relates to a front grill structure of a vehicle, and more particularly, to a front grill structure of a vehicle disposed in a front bumper opening formed in the upper portion of a front bumper of the vehicle to introduce engine cooling air.

2. Description of the Related Art

A conventional front grill structure for a vehicle is disposed in a space surrounded by a front hood, a front bumper and right and left headlamps, which constitute a front body of the vehicle. A front grill is formed such that is long in the vehicle width direction and mounted so as to be located in the upper portion of a front bumper opening disposed in the upper portion of the front bumper to introduce engine cooling air. Further, the front grill has many front grill openings substantially formed through the entire surface thereof, and engine cooling air is taken into an engine area via use of these front grill openings.

As shown in FIG. 6 in a conventional front grill structure for vehicle, a front grill 20$a$ is mounted as close as possible to the front hood 50, between the front hood 50 and a front bumper upper surface 11$a$, so as not to block a front bumper opening 14$a$ formed above a front bumper 10$a$. Further, the front bumper 10$a$ has a front bumper reinforcing flange 12$a$ formed along a front bumper opening end 15$a$, located on the engine area side so as to reinforce the front bumper 10$a$.

Further, Japanese Utility Model Laid-open No. 59-53150 discloses a double-structure radiator grill having an inner grill and an outer grill. The inner grill is disposed above a front bumper opposing a radiator and has air holes for cooling formed therethrough, and the outer grill is disposed to the outside of the inner grill so as to cover the portions of the inner grill where the air holes for cooling are not formed.

In the conventional front grill structure shown in FIG. 6, when the front bumper 10$a$, in which the front bumper opening 14$a$ is formed so as to introduce engine cooling air into the engine area, is mounted on the front surface of a vehicle body structural member, the front grill 20$a$ must be mounted on the front bumper 10$a$ so as not to block the front bumper opening 14$a$. Accordingly, there is a possibility that the front bumper opening end 15$a$ of the front bumper 10a and the front bumper reinforcing flange 12$a$, which are disposed on the engine area side, are visible through the front bumper opening 14$a$, thereby reducing the quality of the external appearance of the front surface of the vehicle.

When the front bumper opening end 15$a$ and the front bumper reinforcing flange 12$a$ are covered to improve the quality of the external appearance of the front surface of the vehicle in the conventional front grill structure as shown in FIG. 6, a cover is formed in the front grill 20$a$ itself to cover the front bumper opening end 15$a$ of the front bumper 10$a$ and the front bumper reinforcing flange 12$a$. When, however, the front grill 20$a$ is formed integrally with the cover, there is a possibility that a dent occurs on the designed surface of the front grill 20$a$, which is the external view of the front surface of the vehicle because the side wall of the front grill 20$a$ is made excessively thick.

Further, the color tone of the front grill 20$a$ is usually made uniform using a color similar to that of a vehicle body in many cases. In contrast, it is preferable to paint the cover covering the front bumper opening end 15$a$ and the front bumper reinforcing flange 12$a$ a dark color such as black or the like because they are located on the engine area side. Thus, it is advantageous to form the front grill 20$a$ separately from the cover.

The double-structure radiator grill disclosed in Japanese Utility Model Laid-open No. Sho 59-35150 comprises the inner grill and the outer grill. However, the conventional radiator grill does not take the relationship thereof to the front bumper into consideration, and it is only intended simply to improve the radiator grill itself. Further, it is not intended to improve the quality of the front surface of a vehicle in consideration of the positional disposal relationship between the front bumper and the radiator grill because no air hole for cooling is formed in the front bumper itself.

SUMMARY OF THE INVENTION

An object of the present invention, which was made in view of the above points, is to provide a front grill structure capable of improving the quality of the external appearance of a front-grill-mounted-portion on the front surface of a vehicle when the front grill is mounted on a front bumper having a front bumper opening.

Another object of the present invention is to provide a front grill structure capable of simply changing the designed surface and the color tone of a front grill according to the external appearance and the body color of a vehicle.

To achieve the above objects, a front grill structure according to a first aspect of the present invention comprises a cover interposed between a front grill and a front bumper opening, which is formed in the upper portion of a front bumper to introduce engine cooling air, so as to cover the upper surface of the front bumper.

With this arrangement, a front bumper opening end and a bumper reinforcing flange are covered with the cover. As a result, they are not visible through the front bumper opening, and thereby the external appearance of the front grill structure can be improved. Further, since the bumper reinforcing flange is covered with the cover, it can be formed at any arbitrary height, and thereby the rigidity of the front bumper can be improved.

According to a second aspect of the front grill structure of the present invention, the cover may be arranged separately from the front grill.

With this arrangement, the occurrence of a dent on the designed surface of the front grill can be prevented because it is possible to suppress the side wall of the front grill to a predetermined thickness. Further, when the designed surface and the color of the front grill are changed according to a change of specification and the body color of a vehicle, it is possible to uniformly paint the cover with a dark color.

According to a third aspect of the front grill structure of the present invention, the cover may be clamped between the front grill and the front bumper.

With this arrangement, the front grill and the cover can be reliably secured to the front bumper.

According to a fourth aspect of the front grill structure of the present invention, openings which are larger than the front grill openings, may be formed in the cover at the portion thereof where it overlaps the rear portion of the front grill.

With this arrangement, when the designed surface of the front grill is changed according to a change in specification of a vehicle, the external appearance of the front grill structure is not defaced because the cover is not visible through the front grill openings. Further, the formation of the openings of the cover can reduce the weight of the cover and its manufacturing cost.

According to a fifth aspect of the front grill structure of the present invention, the cover may include a base sheet-shaped section for covering the upper surface of the front bumper, a sheet-shaped section located in the lower portion of the front grill, and a plurality of ribs for coupling the base sheet-shaped section with the sheet-shaped section.

With this arrangement, the rigidity of the cover itself can be improved as well as it is easy to cope with thermal deformation and the like of the cover.

According to a sixth aspect of the front grill structure of the present invention, locking pieces may be disposed on the lower surface of the base sheet-shaped section and inserted into locking holes formed in a bumper reinforcing flange disposed upright on the upper surface of the front bumper at the rear portion thereof so as to mount the cover on the front bumper.

With this arrangement, it is easy to position the cover and the front grill with respect to the front bumper in the backward and forward, right and left, and upper and lower directions. Further, the external appearance of the front grill structure can be improved because the cover can be mounted such that a fixed interval can be secured between the upper surface of the front bumper and the base sheet-shaped section of the cover.

According to a seventh aspect of the front grill structure of the present invention, positioning pins may project from the rear portion of the front grill at the center thereof, and holes into which the positioning pins are inserted, may be formed in the cover and the front bumper, respectively.

With this arrangement, it is easy to position the front grill and the cover with respect to the front bumper.

While the front grill structure according to the present invention is basically arranged as described above, the front grill and the cover may be combined together as a subassembly. With this arrangement, when the front grill is to be mounted on the front bumper, the work of mounting the front grill can be finished only by aligning the subassembly of the front grill and the cover combined together with a predetermined portion of the front bumper, whereby work efficiency can be improved.

DESCRIPTION OF THE PREFERRED EMBODIMENTS

Figure 1:
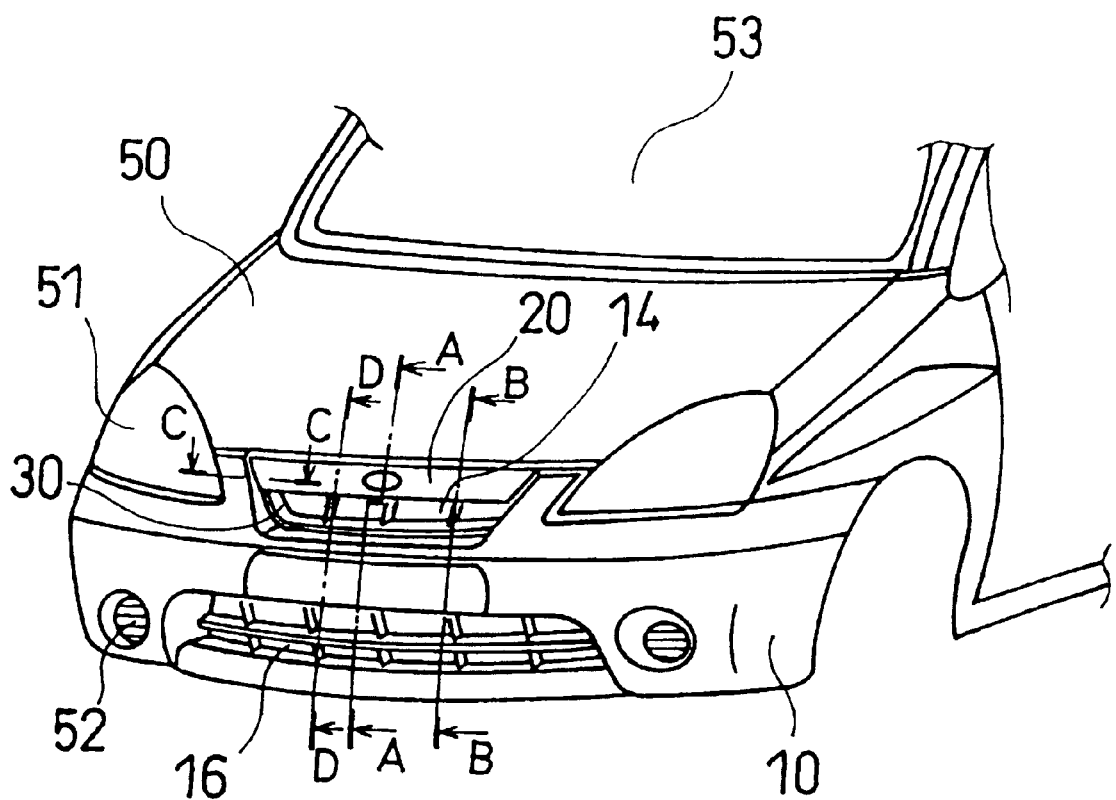
FIG. 1 is a perspective view showing the front surface of a vehicle having a front grill structure according to an embodiment of the present invention.

A front grill structure according to a preferred embodiment of the present invention will be described below in detail with reference to the accompanying drawings. FIG. 1 shows the front surface of a vehicle having a front grill structure according to the embodiment of the present invention.

As shown in FIG. 1, a relatively large front bumper opening 14 is formed in the upper half portion of a front bumper 10 between a front hood 50 and right and left headlamps 51 to introduce engine cooling air. The upper half portion of the front bumper opening 14 is covered with a front grill 20 disposed below a front hood 50, and a cover 30 having ribs 33 is disposed in the lower half portion of the front bumper opening 14. The cover 30 is disposed so as to cover the front bumper opening end 15 of the front bumper opening 14 and a bumper reinforcing flange 12 (refer to FIG. 2). Further, a lower opening 16 acting as a main opening for introducing the engine cooling air is formed in the lower portion of the front bumper 10 at substantially the center thereof, and openings, where fog lamps 52 are disposed, are formed on both the sides of the front bumper 10. Note that reference numeral 53 denotes a front windshield glass.

Figure 2:
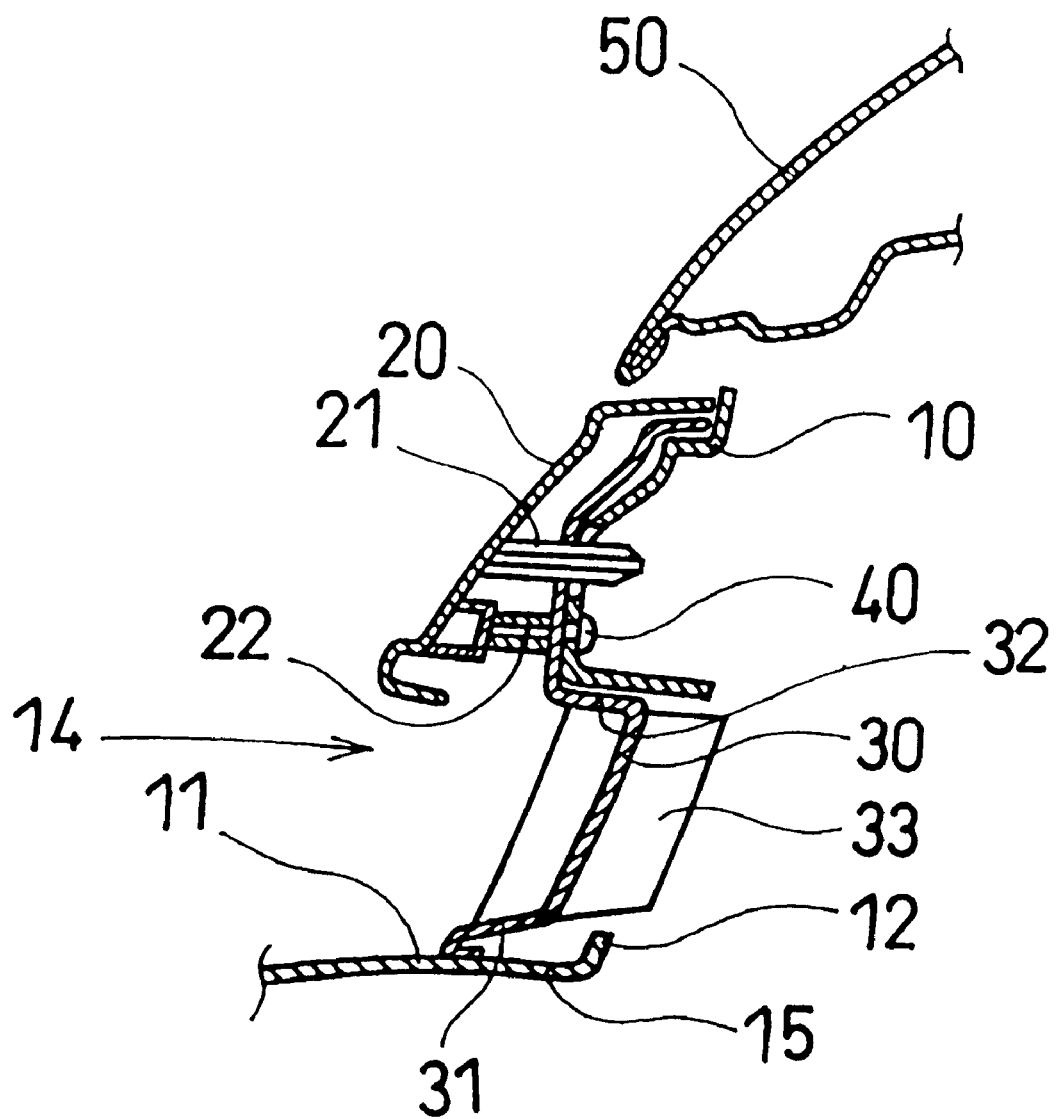
FIG. 2 is a sectional view of the front grill structure taken along the line A—A in FIG. 1.

As will be appreciated from FIG. 2 showing the cross section of the front grill structure taken along the line A—A in FIG. 1, the front grill 20 is coupled with the cover 30 in the front bumper opening 14 by a first screw 40, which is inserted from the back of the front bumper 10 and screwed through a positioning pin 21 and a boss 22 formed on the back of the front grill 20. The positioning pin 21, which is formed on the back of the front grill 20, is inserted into a positioning pin insertion hole 35 (refer to FIG. 7) of the cover 30 and into the positioning pin insertion hole (not shown) of the front bumper 10 and positions the front grill 20 and the cover 30 with respect to the front bumper 10. Further, the first screw 40, which is inserted into a screw insertion hole (not shown) and a first screw insertion hole 36 of the cover 30, is screwed in the boss 22 formed on the back of the front grill 20.

Figure 5:
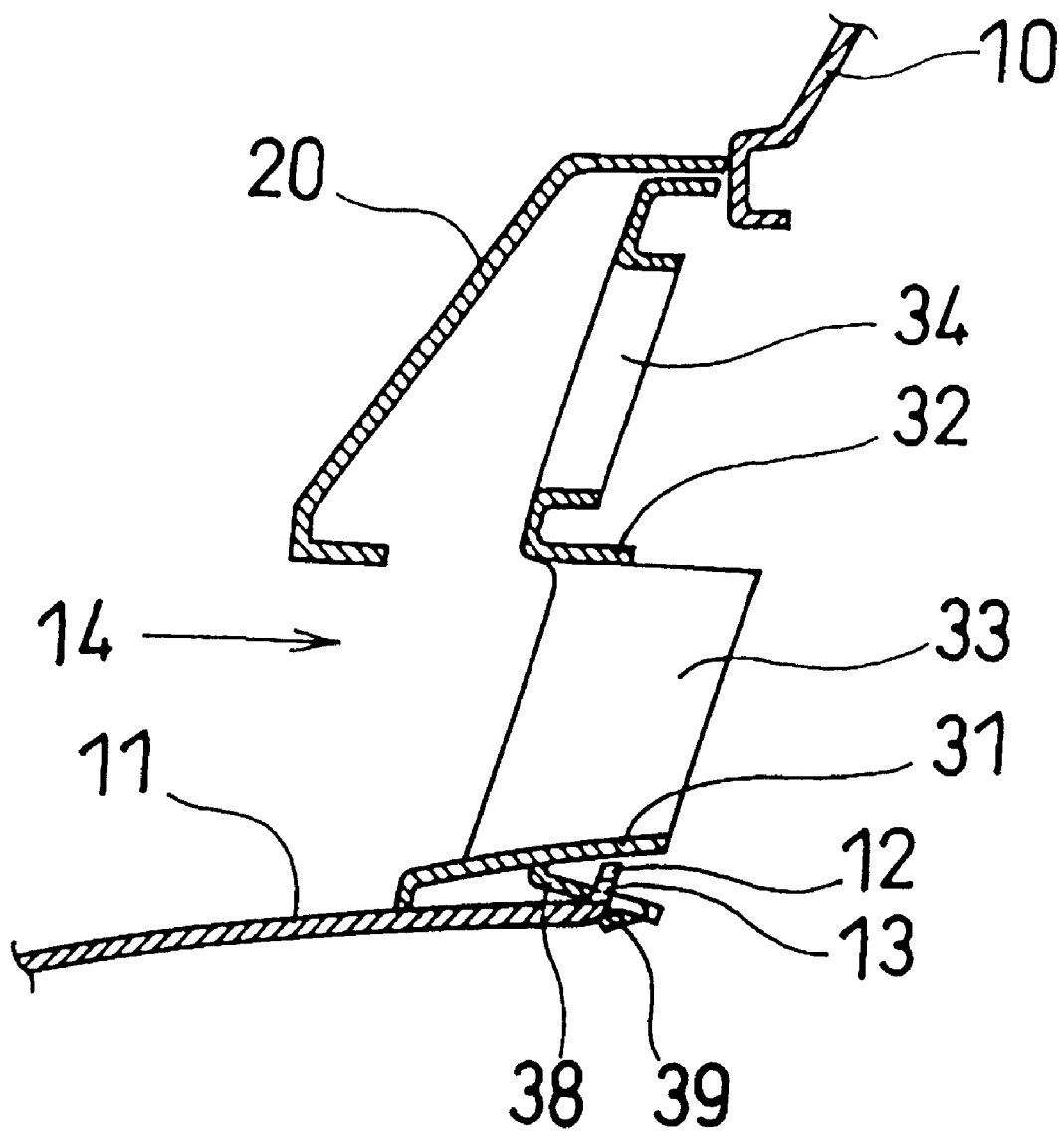
FIG. 5 is a sectional view of the front grill structure taken along the line D—D in FIG. 1.
Figure 6:
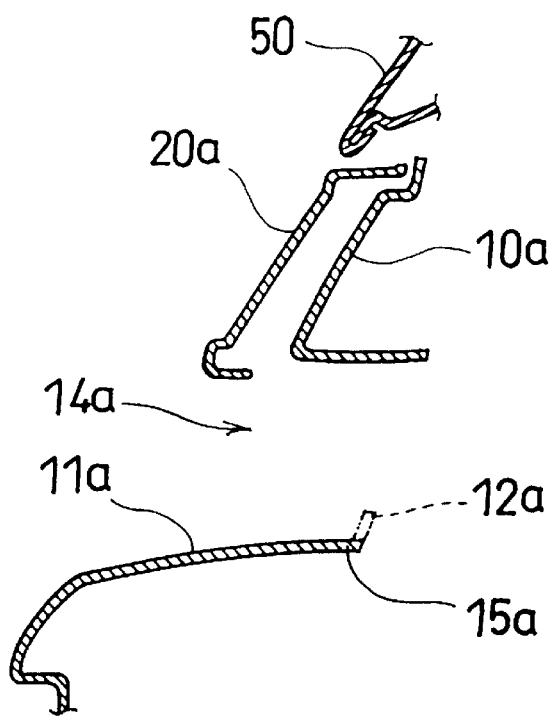
FIG. 6 is a sectional view of a conventional front grill structure taken along a line corresponding to the line A—A in FIG. 1.

Further, the bumper reinforcing flange 12 is formed integrally with the front bumper opening end 15 of the front bumper opening 14 in a vehicle body width direction and covered with a base sheet-shaped section 31 of the cover 30, which is clamped between the front bumper 10 and the front grill 20. Furthermore, as shown in FIG. 5, locking pieces 38 are formed on the lower surface of the base sheet-shaped section 31 of the cover 30 and inserted into the bumper reinforcing flange 12. The locking pieces 38 have locking holes 13 formed therethrough at appropriate intervals, and the locking holes 13 lock locking sections 39 formed integrally with the locking pieces 38.

Figure 3:
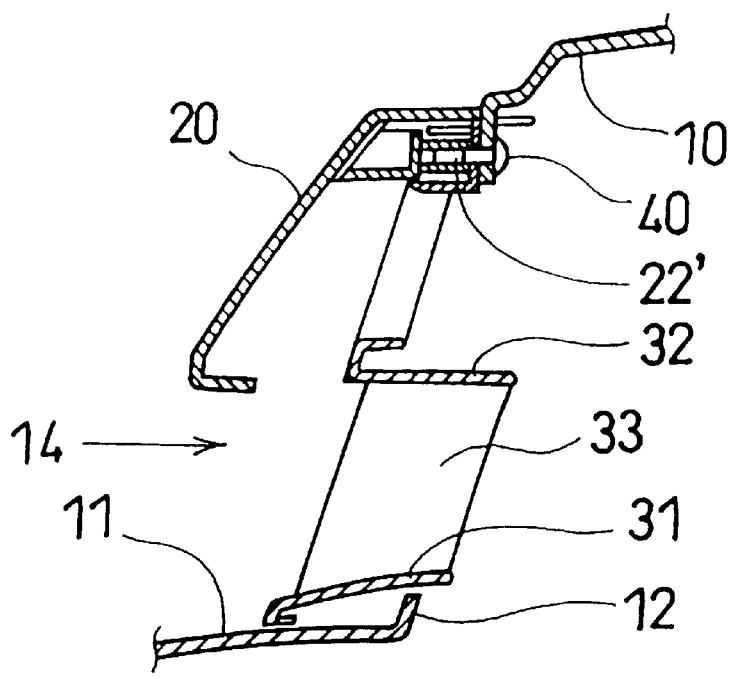
FIG. 3 is a sectional view of the front grill structure taken along the line B—B in FIG. 1.

As described above, the positioning pin 21 and the boss 22 are formed on the back of the front grill 20 at the upper and lower positions at substantially the center thereof. Further, a plurality of bosses 22' are formed on the back of the front grill 20 at predetermined intervals in the vehicle width direction. As shown in FIGS. 2 and 3, the first screws 40, which are inserted from the back of the front bumper 10, are screwed in these bosses 22 and 22' so that the cover 30 is clamped between the front bumper 10 and the front grill 20.

Figure 4:
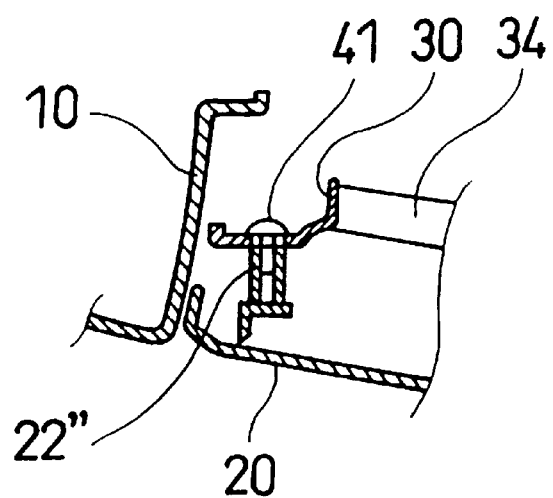
FIG. 4 is a sectional view of the front grill structure taken along the line C—C in FIG. 1.

Further, as shown in FIG. 4, bosses 22" are formed integrally with the front grill 20 at both the ends thereof Second screws 41 are inserted into second screw insertion holes 37 formed in the upper half portion of the cover 30, which will be described later, at both the ends thereof and screwed in the bosses 22″ so that the front grill 20 and the cover 30 form a subassembly.

Figure 7:
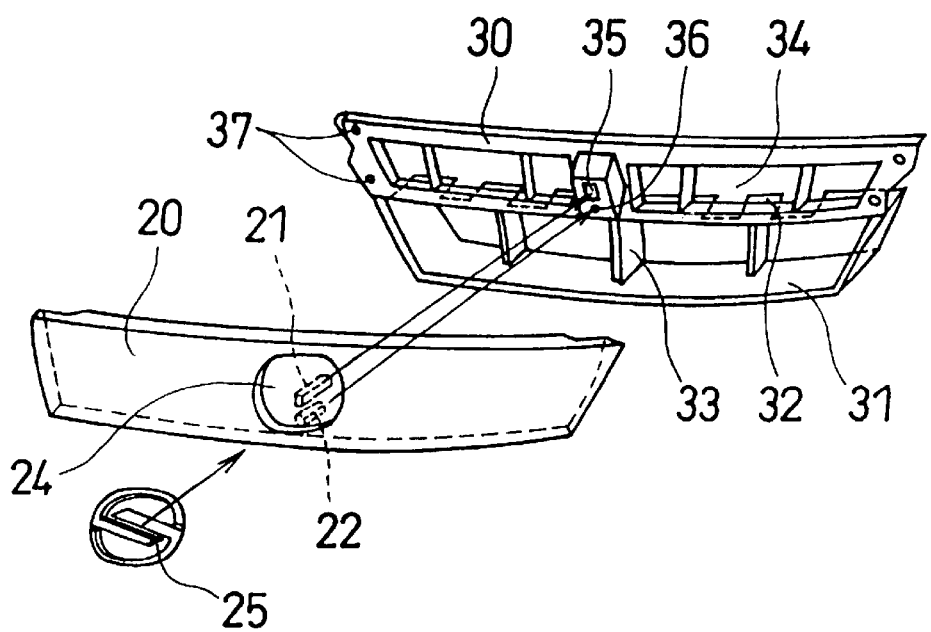
FIG. 7 is an exploded perspective view a front grill structure according to an embodiment of the present invention.
Figure 8:
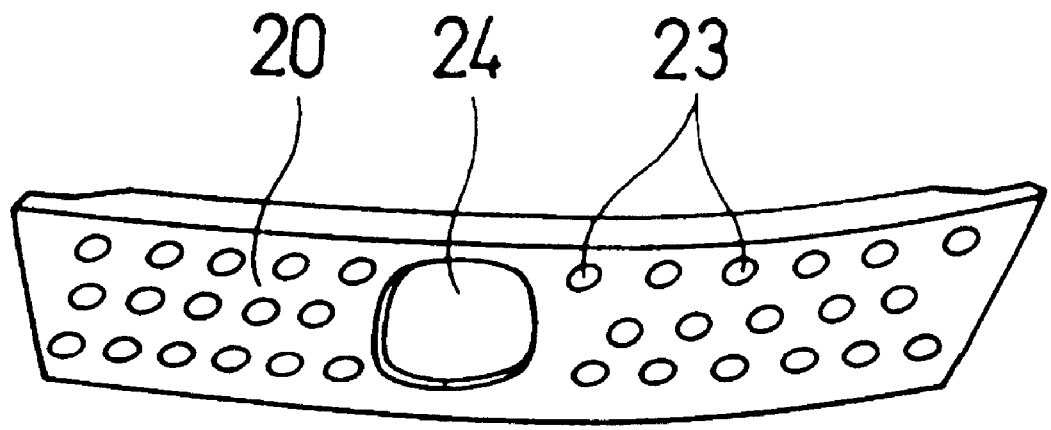
FIG. 8 is a perspective view of another front grill, the designed surface of which is changed.
Figure 9:
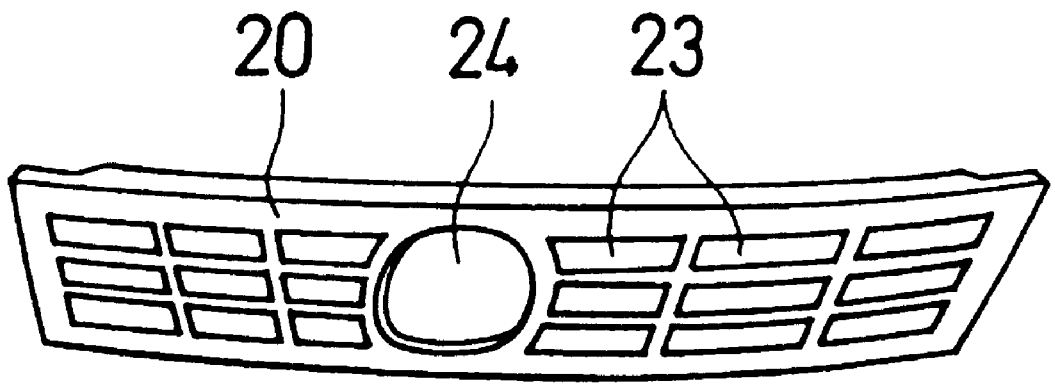
FIG. 9 is a perspective view of a still another front grill, the designed surface of which is changed.

Furthermore, an emblem mounting section 24 is formed through the surface of the front grill 20 as shown in FIG. 7, and an emblem 25 can be mounted on the emblem mounting section 24. Note that, as shown in FIGS. 8 and 9, front grill openings 23 may be formed through the surface of the front grill 20 together with the emblem mounting section 24 to distribute engine cooling air. The front grill openings 23 are formed in a circular hole shape as shown in FIG. 8 or in a grid shape as shown in FIG. 9.

As shown in FIG. 7, the cover 30 clamped between the front bumper 10 and the front grill 20 is formed in a shape substantially similar to that of the open section of the front bumper opening 14. A bulge section, which bulges forward of the vehicle body, is formed in the upper half portion of the cover 30 at substantially the center thereof. The bulge section includes the positioning pin insertion hole 35 and the first screw insertion hole 36 formed therethrough. The positioning pin 21 formed on the back of the front grill 20 is inserted into the positioning pin insertion hole 35, and the first screw 40 is inserted into the first screw insertion hole 36 from the back of the front bumper 10. Further, the second screw insertion holes 37 are formed in the upper half portion of the cover 30 at both the ends thereof, and the second screws 41 (refer to FIG. 4) are inserted thereinto. A plurality of cover openings 34, which are partitioned by a plurality of ribs 33, are formed in the upper portion of the cover 30. These cover openings 34 are formed in such a manner that the open area thereof is larger than that of the front grill openings 23 (refer to FIGS. 8 and 9) formed in the front grill 20 disposed on the front surface of the cover 30.

Further, the lower half portion of the cover 30 is formed of a sheet-shaped section 32, which is formed in substantially an intermediate portion of the cover 30 in the upper and lower direction thereof, the base sheet-shaped section 31, which constitutes the lower side section of the cover 30, and the plurality of ribs 33 which couple the sheet-shaped section 32 with the base sheet-shaped section 31. As shown in FIGS. 2 and 3, the base sheet-shaped section 31 is formed such that the front end thereof comes into contact with a front bumper upper surface 11, and the rear end thereof inclines upward in the backward direction of the vehicle body and covers the bumper reinforcing flange 12 disposed upright on the front bumper opening end 15. The plurality of ribs 33, which couple the sheet-shaped section 32 with the base sheet-shaped section 31, are disposed to face the backward and forward directions of the vehicle so as to smoothly introduce the engine cooling air, which is introduced from the front bumper opening 14 into an engine area.

Further, as shown in FIG. 5, the plurality of locking pieces 38 are formed integrally on the lower surface of the base sheet-shaped section 31 of the cover 30 to position the lower portion of the cover 30 with respect to the front bumper 10. The locking sections 39, which are separated from each other by substantially C-shaped cut grooves and project downward, are formed integrally with the locking pieces 38.

Next, the mounting of the front grill 20 and the cover 30 on the front bumper 10 will be described. When the front grill 20 and the cover 30 are mounted on the front bumper 10, the positioning pin 21 of the front grill 20 is inserted into the positioning pin insertion hole 35 of the cover 30 so that the front grill 20 is overlaid above the cover 30 as shown in FIG. 2. Then, the second screws 41 are screwed in the bosses 22″ of the front grill 20 from the back of the cover 30 as shown in FIG. 4 so that the front grill 20 and the cover 30 are combined together as a subassembly.

Then, the locking pieces 38, which are formed on the lower surface of the base sheet-shaped section 31 of the cover 30, are inserted into the locking holes 13 formed through the bumper reinforcing flange 12 of the front bumper 10 so as to lock the locking sections 39 of the locking pieces 38 to the locking holes 13. Further, as shown in FIG. 2, the positioning pin 21 of the front grill 20 is inserted into the positioning pin insertion hole 35 of the front bumper 10, and the subassembly composed of the front grill 20 and the cover 30, which are combined together, is positioned with respect to the front bumper 10 in the upper and lower, right and left, and backward and forward directions. Thereafter, as shown in FIGS. 2 and 3, the first screws 40 are screwed in the bosses 22 and 22′ of the front grill 20 from the back of the front bumper 10, and the subassembly of the front grill 20 and the cover 30, which are combined together, is mounted on the front bumper 10.

In the front grill structure of the embodiment according to the present invention, the cover 30 for covering the front bumper upper surface 11 is interposed between the front grill 20 and the front bumper opening 14 formed in the upper portion of the front bumper 10 to introduce engine cooling air. Accordingly, the front bumper opening end 15 and the bumper reinforcing flange 12 are not visible through the front bumper opening 14 because the front bumper opening end 15 and the bumper reinforcing flange 12 are covered with the cover 30, and thereby the external appearance of the front grill structure constituting the designed surface of the front surface of the vehicle is improved. Further, since the bumper reinforcing flange 12 is covered with the cover 30, it can be formed at any arbitrary height, whereby the rigidity of the front bumper 10 can be improved.

As described above in detail, according to the first aspect of the present invention, the front bumper opening end and the bumper reinforcing flange are not visible through the front bumper opening through which engine cooling air is introduced because they are covered with the cover. Accordingly, the quality of the external appearance of the front grill structure is improved, and thereby the value of a vehicle as a commodity can be improved.

Further, the bumper reinforcing flange formed in the front bumper opening end can be formed at any arbitrary height because it is possible to cover the bumper reinforcing flange with the cover. Thus, it is easy to improve the rigidity of the front bumper.

According to the second aspect of the present invention, the following advantages can be achieved, in addition to the above advantage. That is, the occurrence of a dent on the designed surface of the front grill can be reliably prevented because it is possible to suppress the side wall of the front grill to a predetermined thickness. Further, when the designed surface and the color of the front grill are changed according to a change in specification and body color of the vehicle, a dark color, which does not affect the external appearance of the front grill structure, can be uniformly used without changing the color of the cover.

According to the third aspect of the present invention, the front grill and the cover can be reliably secured to the front bumper, in addition to the above advantages.

According to the fourth aspect of the present invention, the following advantages can be achieved, in addition to the above advantages. That is, when the designed surface of the front grill is changed according to a change in specification of the vehicle, the external appearance of the front grill structure is not defaced because the openings of the cover are formed in such a manner that the size (area) thereof is larger than that of the front grill openings, and thus the cover is not visible through the front grill opening. Further, the formation of the openings of the cover can reduce the weight of the cover itself and its manufacturing cost.

According to the fifth aspect of the present invention, in addition to the above advantages, the rigidity of the cover itself can also be improved as it is easy to cope with thermal deformation and the like of the cover because the sheet-shaped portion and the base sheet-shaped portion, which constitute the cover are coupled with each other through the longitudinal ribs.

According to the sixth aspect of the present invention, it is easy to position the cover and the front bumper with respect to the front bumper in the backward and forward, right and left, and upper and lower directions, in addition to the above advantages. Further, the external appearance of the front grill structure can be improved because the cover can be mounted such that a fixed interval can be secured between the upper surface of the front bumper and the base sheet-shaped section of the cover.

According to the seventh aspect of the present invention, it is easy to position the front grill and the cover with respect to the front bumper, in addition to the above advantages.

What is claimed is:

1. A front grill structure, comprising a cover interposed between a front grill and a front bumper opening, which is formed in an upper portion of a front bumper to introduce engine cooling air, so as to cover an upper surface of the front bumper, wherein the cover comprises a base sheet-shaped section for covering the upper surface of the front bumper, a sheet-shaped section located in a lower portion of the front grill, and a plurality of ribs for coupling the base sheet-shaped section with the sheet-shaped section, and locking pieces are disposed on a lower surface of the base sheet-shaped section and inserted into locking holes formed in a bumper reinforcing flange disposed upright on the upper surface of the front bumper at a rear portion thereof, so as to mount the cover on the front bumper.

2. A front grill structure according to claim 1, wherein the cover is arranged separately from the front grill.

3. A front grill structure, comprising a cover interposed between a front grill and a front bumper opening, which is formed in an upper portion of a front bumper to introduce engine cooling air, so as to cover an upper surface of the front bumper, wherein the cover is arranged separately from the front grill, and positioning pins project from a rear portion of the front grill at a center thereof, and holes into which the positioning pins are inserted are formed in the cover and the front bumper, respectively.

* * * * *